Aug. 30, 1966     I. L. MARRA     3,269,445
SEALING MATERIAL
Filed Jan. 11, 1965
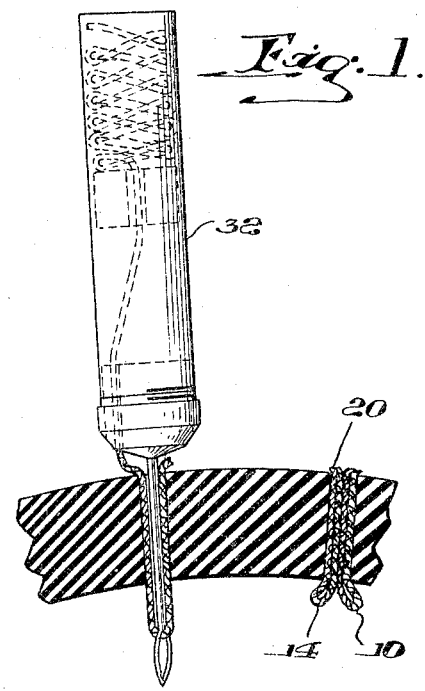
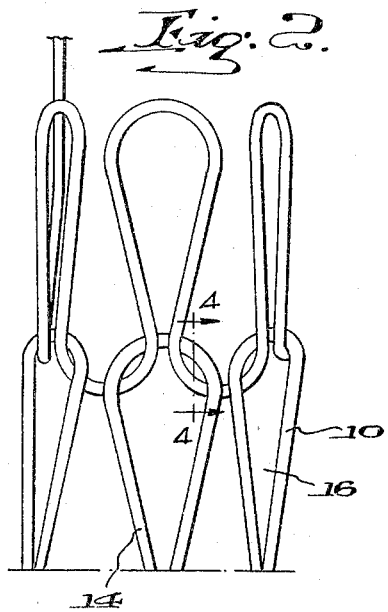
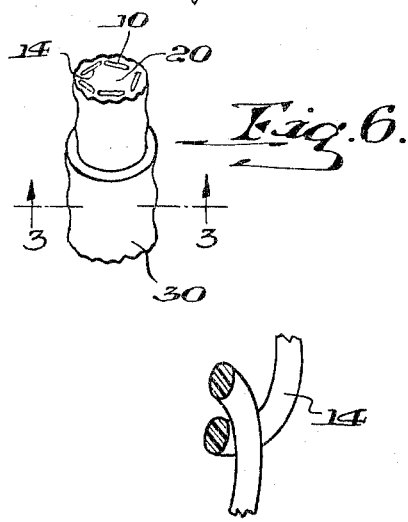
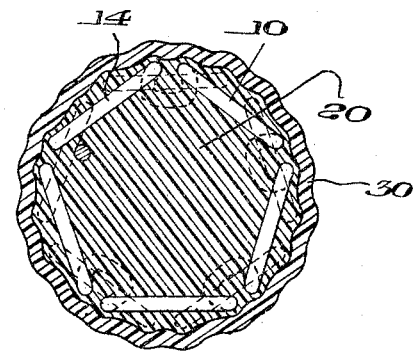
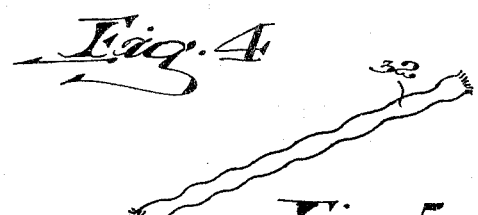
INVENTOR.
IVAN L. MARRA.
BY John A. Young.
his ATTORNEY.

United States Patent Office 3,269,445
Patented August 30, 1966

3,269,445
SEALING MATERIAL
Ivan L. Marra, Butler, Pa., assignor to Fre-Mar Industries, Butler, Pa., a corporation of Pennsylvania
Filed Jan. 11, 1965, Ser. No. 424,703
5 Claims. (Cl. 152—370)

This invention relates to an improved sealing material for repairing punctures or other faults in pneumatic tires and the like.

In U.S. Patent No. 3,049,164, issued August 14, 1962, titled, "Puncture Repair Material," there is disclosed a new and improved puncture repair material of the outside-in type which embodies the combination of a polysulphide or other permanently malleable material and a woven or knitted sleeve construction which serves as a re-enforcement and a carrier for the permanently malleable plastic material. This invention has gained wide recognition, not only in the United States but throughout the world, as a superior leak-repairing material and has proved its practical benefits by repairing over a substantial number of years, literally hundreds of thousands of tires which have logged many hundred millions of miles.

Experience has shown that a permanently malleable plastic material, even though contraindicated by the art at the time of the invention, has proven to be practical boon to the transportation industry, including motor vehicles, trucks, buses, military vehicles and other transportation media.

In the previous invention noted, the permanently malleable plastic material, which is in the form of a polysulphide, is a somewhat expensive material of construction and it is, therefore, one of the objects of the present invention to provide a plastic sealant which is somewhat less expensive in composition but which is nontheless responsive to all of the physical properties as the polysulphide and which make the polysulphide a suitable repair ingredient. That is, the material proposed in the present invention shares in common most of the important functional characteristics of the polysulphide material, as to its ability to be plastically deformable, its flowability into all of the crevices and voids which are thereby filled and which has permanent malleability during use in order to serve as a permanent repair for the injury.

In a tire repair material of the class described, that is, an external cord type repair material, the product is laced into the puncture by a suitable tool; the plastic material performs the sealing function and is generally distributed throughout the opening to fill the opening, coming into intimate contact with the edge of the puncture to form a tight grip therewith. Since the plastic material is flowable, the principle is to use a sleeve having a substantial tensile force and which serves as a carrier for the plastic material whereby the plastic material can be disposed within the opening, filling the opening and sealing it against leakage. In other words, the function of the two respective repair ingredients in the present invention is the same as that described and noted for the combination of polysulphide material and sleeve in U.S. Patent No. 3,049,164.

Also, the method of producing the material of the present invention is in accordance with that described in co-pending application No. 260,191, filed February 21, 1963, now Patent No. 3,187,070, titled, "Process for Producing Sealing Material."

In accordance with the present invention, there are numerous ways of manufacturing the product, including using a combination of polysulphide material, together with the new and improved polysulphide substitute, or to replace the polysulphide material entirely with the new nitrile type repair product, which can be used as a total substitute for the polysulphide material. In either instance, however, the materials are combined together either by extruding a core material and knitting or weaving a sleeve reenforcement over the outer sleeve of the core; or by forming first a sleeve having a substantial tensile strength and constructed of a woven, knitted or suitably oriented plurality of strands or filaments which provides sufficient open spaces along the length of the sleeve and permit transition of the tire repair material under pressure through the open spaces and thereby completely filling the space surrounded by the sleeve to form a core of plastic tire repair material.

In addition, the present invention contemplates the addition of a thin outer lamination of such repair material surrounding the sleeve and which tends to be scraped off as the repair material is laced into the hole or rupture of the tire and comes into intimate contact with the irregular edges of the tire breach, forming both a seal and a bond for maintaining the repair material within the breach and thereby forming a plug against leakage.

Accordingly, one of the principal objects of the present invention is to provide a new and improved tire repair material in which the plastic component of the material is extruded within the interior of the previously constructed sleeve to form a core of said plastic tire repair material.

A further object of the present invention is to provide a new and improved tire repair material in cord form which includes a precisely sized outer diameter and has a substantially uniform cross section throughout the length of the tire repair material.

Another object of the present invention is to provide a combination of high tensile strength material which serve as a carrier for a flowable, plastic material capable of filling and sealing ruptures and other faults in tires which would otherwise produce a leakage.

A still further object of the present invention is to provide a tire repair material in which the plastic material will be converted to a B-stage or semi-polymerized condition, and will not develop voids or other discontinuities within the core of the material. In this way the material being of uniform density produces a more effective seal then would otherwise be the case if such material would change substantially in volume during the process of manufacture.

It is an overall object of the present invention to provide a tire repair material which is substantially unaffected by normal road use and will remain mechanically fixed within a rupture or other fault of the tire and maintain an effective seal during use.

Other objects and features of the present invention will become apparent from a consideration of the following description which proceeds with reference to the accompanying drawings, wherein:

FIGURE 1 illustrates a tire repair tool and repair material within an injury of a tire;

FIGURE 2 is an isometric view of a part of the material showing an enlarged sleeve;

FIGURE 3 is a transverse section of the repair product produced in the present invention;

FIGURE 4 is an enlarged detail view of a portion of a knitted sleeve of FIGURE 2;

FIGURE 5 illustrates the finished repair product, broken at the opposite ends thereof; and, FIGURE 6 is an enlarged isometric view of the repair product.

Referring now to the drawings, the tire repair material is manufactured in the form of a continuous length product which resembles a cord. The component parts of the repair material are a sleeve 10 which is comprised of a number of filaments 14 which are woven or otherwise suitably constructed into the sleeve having a series of spaced openings 16 along the length of the sleeve. The purpose of the sleeve is to carry the repair product designated generally by reference numeral 20 into the injury, at which point the repair material flows plastically in a lateral sense to fill all of the crevices and effect an airtight seal, plugging the entire cross sectional area within the injury. The sleeve 10 once the repair is in place, serves to reenforce the plastically flowable material. The plastic material is flowable under pressure and provides a stable, relatively-heat-insensitive sealing material which grips the surface of the tire and is itself impervious to passage of air through the material. The plastic material, in one embodiment of the invention, consists in part of a polysulphide composition.

One polysulphide composition which has been found satisfactory for the purposes of the instant invention comprises the polysulphide polymer LP-2 "Thiokol" which is a polymer of bis (ethylene oxy) methane containing disulfide linkages with terminal Thiol (—SH) groups.

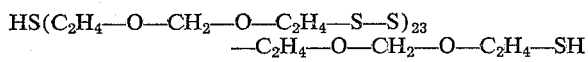

Obviously, other suitable polysulphides may be employed if found desirable.

A typical basic polysulphide formulation is as follows:

| | |
|---|---:|
| Liquid polysulphide polymer (as above) | 100 |
| Carbon black | 30 |
| Curing agent: | |
|     Lead dioxide | 70 |
|     Stearic acid | 30 | the mixing ratio being 10 parts of base to one part of curing agent.

In the present invention, the polysulphide material is substituted in whole or in part by a second plastic material which corresponds in physical properties to that of the described polysulphide product, it being relatively heat insensitive and inert to the tire repair material, it grips the surface of the tire, is impervious to air and is permanently malleable. Likewise, it is extrudible under pressure within the sleeve and can also be extruded as a lamination over the surface of the polysulphide product.

The new plastic material is, however, of less expensive composition yet functionally it is of equivalent or superior properties and can be used in partial or entire replacement for the polysulphide depending upon the preference of the user. Yet, the properties of the finished product, i.e., a finished seal effected with the product are superior being, in fact, even less prone to produce leakages.

The plastic material which is used in the present invention is found to have certain improvements which make it superior in many respects to the composition previously used and consists of butadiene-acrylonitrile polymer. Such material provides a substantial improvement particularly with respect to its heat resistance and the general functional properties of the product. Moreover, the product is less expensive than the polysulphide and for that reason is preferred.

The composition which is proposed as a partial or entire substitute of the polysulphide consists of a rubbery base material composed of rubbery butadiene acrylonitrile polymer, including a softener in the form of tributoxy ethyl phosphate zinc oxide.

The material is available from Minnesota Mining & Manufacturing Company and is disclosed in the issued United States Patent No. 2,537,982, dated January 16, 1951, and invented by Alfred L. Finn.

The product consists of a tough, stable, rubbery polymer such as a butadiene-acrylonitrile polymer which polymerizes to form a tough temperature-and-oil resistant product which is impervious to air and is dense, permanently malleable and extrudible under pressure. The composition includes in parts by weight:

| | |
|---|---:|
| Rubbery base, to be compounded on a cold mill. | |
| Rubbery butadiene-acrylonitrile polymer | 800 |
| Tributoxy ethyl phosphate (softener) | 100 |
| Zinc oxide | 80 |

A solution is then prepared, using the following:

| | |
|---|---:|
| Rubbery (milled) base | 980 |
| Tackifier resin | 560 |
| Dixie clay | 400 |
| Tributoxy ethyl phosphate | 100 |
| Short fiber asbestos (7R grade) | 92 |
| Salicyclic acid | 80 |
| Methyl isobutyl ketone | 360 |
| Methyl ethyl ketone | 1425 |

It is found convenient first to dissolve the rubbery base in the mixed solvents. The viscosity of the material is adjusted to the conditions of the operation in the manner disclosed in my co-pending application No. 260,191, filed February 21, 1963. That is, the material should be extrudible under pressure and containable within the die pot so that, as the sleeve is passed continuously through the die pot the plastic is forced through the interstices of the knitted sleeve to form a dense continuous void-free core within the interior of the sleeve.

In the finished article, the nitrile material forms either an outer lamination 30 or is a substitute in entirety for the polysulphide.

The filament 32 which is used in constructing the sleeve is comprised of polypropylene. It can also include other plastic materials such as nylon, polybutylene, etc., all of which are found to have the appropriate combination of tensile strength, heat resistance, flexibility, and inertness with respect to the permanently malleable material or materials in combination therewith. It is also essential, of course, that the resulting product be resilient, heat resistant and can withstand all the other forces which are normally encountered by a repair plug during use.

The additional plastic material, that is, the nitrile compound, can either be formed as a lamination over the outer surface of the product or it can be used as a complete substitute for the polysulphide. In either event, when the nitrile and polysulphide are used in combination, the polysulphide-and-sleeve product is first manufactured as taught in co-pending application Serial No. 260,191, filed February 21, 1963. Following this, the nitrile material may be extruded over the outer surface of the product to form the finished repair material.

Although the present invention has been illustrated and described with certain selected example embodiments, it will be understood that these are illustrative and in no sense restrictive thereof. It is reasonably to be expected that those skilled in this art can make numerous revisions and adaptations of the invention to meet individual design requirements and it is intended that such revisions and adaptions as incorporate the herein disclosed principles will be included within the scope of the following claims as equivalents of the invention.

What is claimed is:

1. A tire repair product comprising a loosely knitted sleeve and a permanently malleable extrudible plastic material combined with said sleeve and carried into the injury of a tire, said plastic material including rubbery butadiene-acrylonitrile polymer.

2. A tire repair product comprising a loosely knitted sleeve and permanently malleable extrudible plastic material combined with said sleeve and carried into the injury of a tire, said plastic material including a core of polysulfide material of permanently malleable composition extruded within the core of said loosely knitted sleeve and having an outer lamination of a second plastic material consisting essentially of rubbery butadiene-acrylonitrile polymer.

3. A tire repair product comprising a loosely knitted sleeve and a permanently malleable extrudible plastic material combined with said sleeve and carried into the injury of a tire, said plastic material including a flowable, permanently malleable polysulfide material which is stable and relatively heat insensitive, and a second plastic material secured to said first plastic material and including rubbery butadiene-acrylonitrile polymer.

4. A tire repair product comprising a loosely knitted sleeve and a permanently malleable extrudible plastic material combined with said sleeve and carried into the injury of a tire, said plastic material including a flowable, permanently malleable polysulfide material which is stable and relatively heat insensitive, and a second plastic material secured to said first plastic material and including rubbery butadiene-acrylonitrile polymer and a softener in the form of tributoxy ethyl phosphate and zinc oxide.

5. A tire repair product comprising a loosely knitted sleeve of non-fibrous monofilament which is constructed into a continuous length structure having a hollow center, and a permanently malleable extrudible plastic which is translated through the interstices of said sleeve to form a dense continuous void-free core within the interior of said sleeve and is comprised of a rubbery base of a rubbery butadiene-acrylonitrile polymer at 800 parts by weight of the composition and 100 parts by weight tributoxy ethyl phosphate as a softener and zinc oxide 80 parts by weight.

References Cited by the Examiner
UNITED STATES PATENTS

| | | | |
|---|---|---|---|
| 2,955,970 | 10/1960 | Rice et al. | 156—244 |
| 2,979,431 | 4/1961 | Perrault | 156—244 |
| 3,049,164 | 8/1962 | Humphreys et al. | 152—370 |
| 3,169,567 | 2/1965 | Covert et al. | 152—370 |

OTHER REFERENCES

Whitby, G. S.; Synthetic Rubber, N. Y., John Wiley & Sons, 1954; pages 804–806, 810, 812 and 814, T. S. 1925. W45, C.5

ARTHUR L. LA POINT, *Primary Examiner.*

EUGENE G. BOTZ, *Examiner.*

C. W. HAEFELE, *Assistant Examiner.*